April 26, 1932.  H. P. SPARKES  1,855,614
METER PANEL
Filed Nov. 13, 1929   2 Sheets-Sheet 1
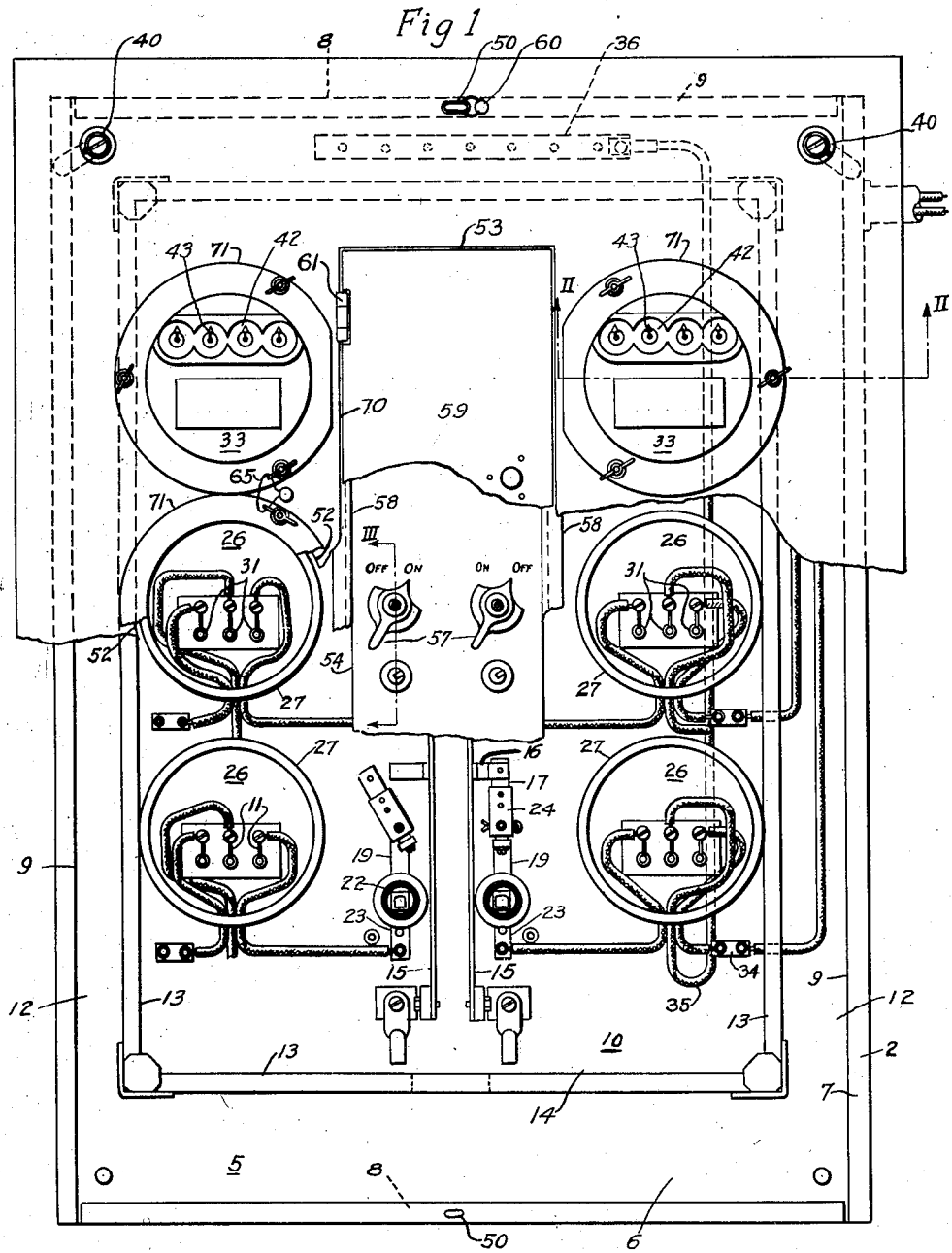
INVENTOR
Harry P. Sparkes
BY
ATTORNEY April 26, 1932.   H. P. SPARKES   1,855,614
METER PANEL
Filed Nov. 13, 1929   2 Sheets-Sheet 2
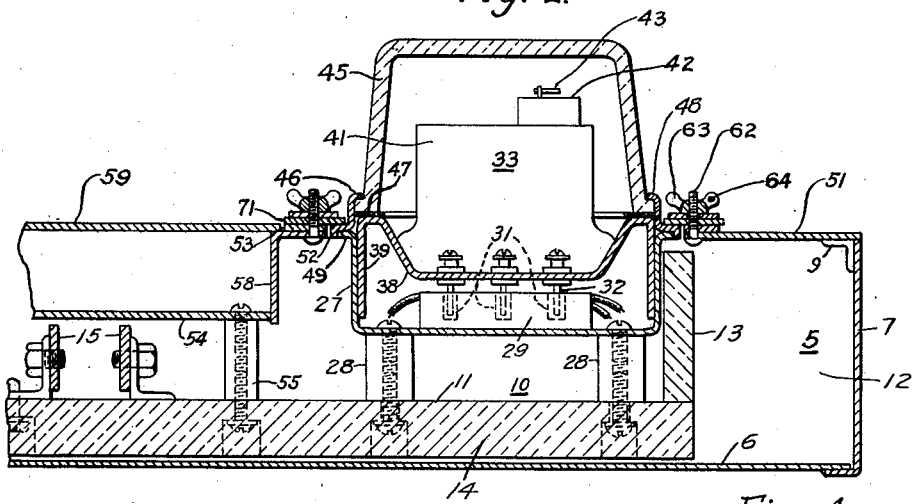
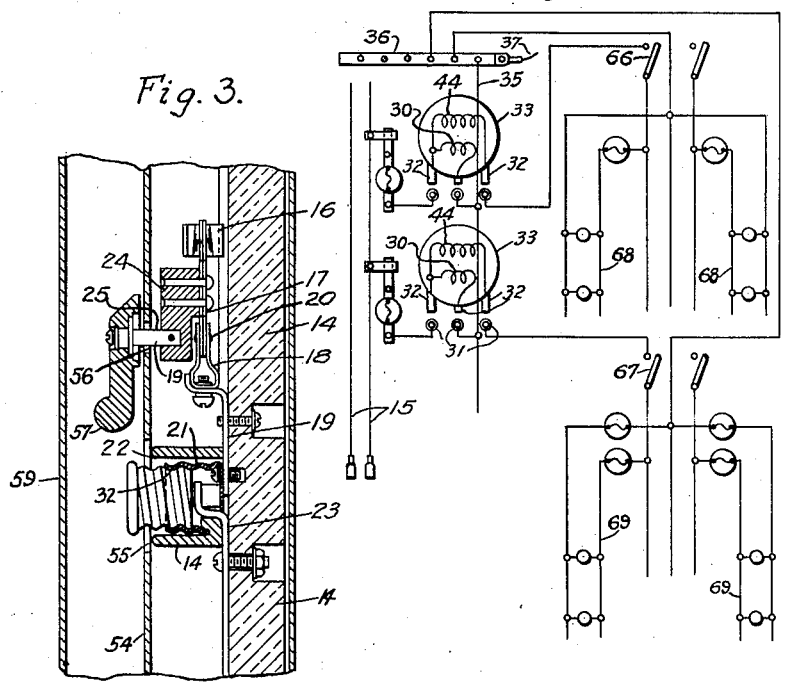
INVENTOR
Harry P. Sparkes
BY
ATTORNEY Patented Apr. 26, 1932

1,855,614

UNITED STATES PATENT OFFICE

HARRY P. SPARKES, OF PITTSBURGH, PENNSYLVANIA, ASSIGNOR TO WESTINGHOUSE ELECTRIC & MANUFACTURING COMPANY, A CORPORATION OF PENNSYLVANIA

METER PANEL

Application filed November 13, 1929. Serial No. 406,969.

My invention relates to metering-panel devices and particularly to current-distributing metering panels wherein a plurality of meters are associated with the current-distributing-and-controlling devices.

Heretofore, it has been customary to provide a metering panel wherein the branch-line-circuit terminals and control devices were grouped within a single housing and associated with separate meters usually mounted on the wall exteriorly of the housing and connected to the distributing terminals by exposed conductors. Special means were required for sealing the meter terminals in order to prevent theft of current.

Meters, and especially the meters of office buildings, have also been mounted in separate compartments of the distributing panel housing that were closed by separate doors, but this arrangement has necessitated, heretofore, provision of a distributing panel having a considerably greater depth than that ordinarily required for the distributing panel, in order to accommodate, and to provide sufficient clearance between the door and the outer extremities of, the meter casings. Such installations were usually wired in the field after the meters had been fastened to the rear wall of the housing and required considerable skill and consumed the valuable time of an experienced electrician.

Meters of the disconnectible plug-in type, such as is disclosed in the copending application of Walter G. Mylius and Bert G. La-Bar, Serial No. 305,778, filed September 13, 1928, assigned to the assignee of this application, have been used in association with distributing panels but have been mounted exteriorly of the distributing panel housing where they were readily accessible for removal, the principal advantage of this type of meter mounting residing in the fact that a material saving in the cost of meter testing resulted.
Tested meters may be readily substituted, by an operator, for a meter in service, and the latter be returned to the central power station where it may be accurately and economically tested by plugging it into test receptacles mounted on a test rack. After adjustment and calibration, the meter may be returned to service in a different circuit.

The wiring of the receptacles for receiving the plug-in meters and connection of the receptacles to the distributing panel was also done in the field at relatively high cost, and, to render such installations suitable for outdoor use, it was necessary to extend a metal conduit between the metering-panel housing and each individual meter casing. Mounting of meters for outdoor service is, therefore, relatively expensive, but, because of the many conveniences of inspection and meter reading afforded by outdoor installations, the demand is steadily increasing.

It is an object of my invention, to provide an enclosed metering and distributing panel that utilizes the advantages incident to, and inherent in a meter housing of the plug-in type by mounting the meter-plug receptacles within the distributing-panel housing where they may be permanently connected, at the factory, to the controlling and distributing devices to thereby eliminate the usual time-consuming field-wiring operation and the installation of special conduit connections between the metering-panel housing and the meter casing, as well as special devices for covering meter terminals and, at the same time, conserve valuable space.

Another object of my invention is to provide an enclosed metering and distributing panel that shall be adapted for either outdoor or indoor use, without change in construction, and wherein a panelboard housing of standard depth, required only for the distributing and controlling devices, may be utilized, even though the height of the meter casing is greater than the depth of the housing thereby conserving material and reducing the shipping weight of the assembled metering-panel unit.

A further object of my invention is to provide an enclosed metering and distributing panel of less than standard depth, having a trim for closing the panel housing that is of substantially standard construction and is provided with openings through which the standard plug-type meter casings project in such manner that they normally close the openings and prevent access to the interior of the housing therethrough and through which the removable portion of the meter cover may be withdrawn to permit removal of the plug-in meter unit without disturbing the trim or other meter units.

A further object of my invention is to provide an enclosed metering and distributing panel having the above-noted characteristics wherein the flanged joint between the removable portion of the meter casing and the stationary portion thereof is substantially in the plane of the trim for the panel housing and wherein the space between the cover portion and the opening in the trim is closed by a clamp ring disposed substantially in the plane of the trim and is detachably secured thereto.

A further object of my invention is to provide an enclosed metering and distributing panel wherein the meters are disposed in two spaced vertical rows and wherein the feed buses extend vertically between the rows and are provided with contact jaws of disconnecting switches and wherein the terminals of a fuse receptacle support pivoted knife-blade switches for engaging the contact jaws, thereby reducing the number of parts required for providing a fused-switch connection between the meter terminals and the feed buses.

A further object of my invention is to provide an enclosed metering and distributing panel wherein the current-controlling devices, such as fuses and disconnect switches disposed between the meter and the feed buses, are arranged in vertical rows between vertical rows of meters and wherein a cover is provided for the feed buses and current-controlling devices having openings through which the devices are accessible and wherein the panel housing is provided with a trim plate having openings through which the meters are accessible and an opening through which the said devices only are accessible.

Another object of my invention is to provide an enclosed metering and distributing panel wherein plug-in-type meter receptacles are mounted within the housing for receiving plug-in type detachable meters and wherein the meters are provided with individual covers that are detachably associated with a sealed housing cover to render them individually removable and also removable with the cover to simultaneously expose the receptacles and associated meters and thus facilitate a complete exchange of meters.

A further object of my invention is to provide an enclosed metering and distributing panel, having the above-noted characteristics, wherein the meter units are of the plug-in type that may be readily removed for test and inspection and be replaced, if desired, in a new contact-engaging position for rendering the meter inactive and the receptacle contacts inaccessible, and wherein the meter covers are transparent and project through openings in the housing trim to render the sides and front of the meter visible for inspection and wherein the covers are sealed to prevent unauthorized access to the meters.

These and other objects that will be made apparent throughout the further description of my invention are obtained by means of the apparatus hereinafter described, and illustrated in the accompanying drawings, wherein, Figure 1 is a front elevational view of a meter and distributing panel embodying features of my invention, portions of the cover being broken away and certain of the meter units being removed;

Fig. 2 is a longitudinal section through a portion of the apparatus shown in Fig. 1, taken on line II—II thereof;

Fig. 3 is a vertical section through a portion of the apparatus shown in Fig. 1, taken on line III—III thereof, and Fig. 4 is a wiring diagram showing the manner in which the metering panel is associated with the load circuits.

Referring to the drawings, the metering and distributing panel comprises a sheet-metal housing 5 having a rear wall 6, side walls 7 and end walls 8, the side and end walls being provided with the usual marginal flanges 9, the purpose of which will hereinafter appear. The housing is divided into an interior compartment 11 for containing the circuit-distributing-and-controlling devices, including the meters, and an exterior compartment 12 which constitutes a wiring gutter for receiving conductors to connect the meters to the branch-line switch or circuit breaker, the compartments being separated by a partition comprising insulating walls 13 that surround an insulating base 14, as indicated in Figs. 1, 2 and 3.

Feed bus bars 15 extend vertically within the compartment 10, near the center thereof, and are provided with switch contact jaws 16 that extend laterally therefrom and are engaged by contact blades 17 that are pivotally mounted in pivot jaws 18 secured to terminal straps 19. The latter are connected to the threaded shells 21 of fuse receptacles 22 mounted upon the insulating base 14.

The central contact of the fuse receptacle comprises a terminal strap 23 that is mounted on the base 14 and, like the terminal strap 19, projects from the receptacle 22 and is disposed in parallel relation to the bus bars 15.

The contact blades 17 are provided with insulating blocks 24 upon which are mounted operating shafts 25 that are aligned with the axes of the hinge pins 20 of the jaws 18 in order that rotation of the shafts 25 shall cause opening and closing movements of the contact blades 17.

Disposed on opposite sides of the bus bars 15, are two vertical rows of meter receptacles 26, each of which comprises a sheet-metal pan 27 that is mounted upon spacing blocks 28 attached to the base 14, as indicated in Fig. 2. An insulating block 29 is mounted within the pan 27 and is provided with three contact sleeves or receptacles 31 imbedded in the insulation to constitute receptacles for receiving the contact plugs 32 of a detachable meter unit 33 to be hereinafter described.

It will be noted that the outermost receptacles 31 are connected to conductors that are respectively connected to the fuse terminals 23 and to branch-line terminals 34 mounted on the base 14. The central contact receptacle 31 is connected to a common conductor 35 that is connected to the neutral multiple-connection terminal 36 of the neutral conductor 37 of a three-wire feed circuit.

The meter unit that cooperates with the receptacle comprises a sheet-metal base pan 38 having an annular flange 39 which slidably telescopes within the pan 27, as indicated in Fig. 2, the pan serving to support the watt-hour-meter mechanism 41 which is of the usual construction and is provided with dials 42 that are traversed by the usual indicating hands 43.

Referring to Figs. 2 and 4, the meter is provided with three contact plugs 32, the outermost of which are connected to the terminals of a current coil 44, and the central plug is connected to a potential coil 30.

To insert the meter unit in service connection with the receptacle 26, the plugs 32 are aligned with the receptacles 31, and the meter unit is then pushed inwardly, thus bringing the plugs 32 into conductive contact with the contact sleeves or receptacles 31. The meter is provided with a glass cover 45 that is of cup-shape and is provided with an annular flange 46 which engages a felt washer 47 that is attached to the base pan 38 of the meter, as indicated in Fig. 2. A pressed-metal flanged band 48 engages the flange 46 of the cover and an annular flange 49 on the receptacle pan 27 and serves as an aligning ring for maintaining the cover and the receptacle pan in axial alignment. The manner in which the cover is clamped in operative position will hereinafter appear.

One of the objects of my invention is to provide an enclosed meter in a distributing panel wherein the housing is of no greater depth than that usually required for the current-controlling-and-distributing apparatus of the panel, even though the depth of the meters associated with the panel is greater than that of the panel. It is also an object of my invention to use a flat and relatively inexpensive trim plate for closing the panel in order to conform to standard practice of panelboard-housing construction.

Panelboard housings are usually mounted within wall structures in such manner that the trim plate is flush with the wall. By conforming to the standard practice in the design and proportions of the housing, it is possible to provide a metering-and-distributing-panel housing wherein the meters are enclosed within the housing and, at the same time, provide a metering-panel housing that may be imbedded in the wall structure, either in inside or in outside installations. In either event, the trim plate is disposed flush with the surface of the wall.

By providing a metering-panel housing that may be inserted within a wall and be rendered accessible from the exterior face thereof, the inspection and reading of meters is greatly facilitated, and meters may be read without necessitating gaining access to the interior of the building, which is not at all times possible.

With these objects in view, I have disposed, the bus bars and the branch-line circuit-controlling-and-disconnecting switches and fuses substantially in the same plane upon the insulating base 14, thus reducing the depth of the control and feed bus apparatus and obtaining a corresponding reduction in the required depth of the housing. By reason of this construction, the depth of the housing is reduced over that usually required for current-distributing metering panels, resulting in a reduction in manufacturing cost and shipping weight.

The closure for the metering-panel housing comprises a sheet-metal trim plate 51 that is secured to the housing by means of adjustable trim clamps 40, and engages the under face of the flanges 9 of the sidewalls of the housing and detachably secures the trim plate to the housing. The trim plate is provided with circular openings 52 that register with the receptacle pans 27, through which the receptacles are accessible. The trim plate is also provided with a central rectangular opening 70 through which the fuse receptacles 22 and the operating shafts 25 of the disconnect switch blades 17 are accessible. The trim plate is sealed against unauthorized removal by means of hasps 50 which project through openings in the ends of the plate and have perforations through which seals 60 are inserted.

A metal barrier plate 54, that is supported on insulating spacing bushings 55, serves to cover the bus bars and the associated disconnect switches and fuse terminals, the plate being provided with openings through which the fuse receptacles 22 are accessible and with openings 56 through which the operating shafts 25 project.

Insulating operating handles 57 are secured to the shafts 25 to operate the contact blades 17 for disconnecting any selected meter from the circuit, the barrier plate 54 being provided with the legends "Off" and "On" for indicating the position of the disconnect switches.

In order to prevent access to the meter receptacles through the opening 53 in the trim plate, the margin of the opening is provided with an inwardly extending flange 58 that surrounds the edges of the barrier plate 54 and completely closes access to the interior of the compartment 11 through the opening 53. A door 59 is hinged, by means of hinges 61, to the trim plate and serves to close the opening 53.

It will be noted that the trim plate is substantially in the same plane with the inner flange of the band 48 and that the transparent cover extends beyond the front face of the trim plate to render the side and front of the meter 41 visible from the front face of the trim plate for the purpose of inspection and meter reading.

The cover is clamped in operative position by means of a flat clamping ring 71 that overlaps the trim plate 51 and the inner flange of the band 48, the clamping ring being provided with perforations through which threaded clamping screws 62 extend and are provided with thumb nuts 63. The thumb nuts are provided with perforations 64 through which seals 65 may be inserted for preventing unauthorized removal of the meter covers. The clamping ring 71 serves to close the space between the trim plate and the meter and, as indicated in Fig. 1, six meters may be sealed by four seals, since the thumb screws of adjacent meters are sealed together by a single seal.

By reason of the use of plug-in-type meters and, by reason of the fact that the receptacles may be completely wired within the housing, the metering panel may be completely assembled at the factory where facilities for assembling materially expedite complete assembly at reduced cost over that usually incident to installation of a metering panel where only a portion thereof is assembled at the factory and the wiring connections are completed in the field.

The necessity for expensive conduit and meter-terminal covers is eliminated by reason of the fact that the metering panel is completely assembled at the factory ready for mounting in the wall and receiving the meters. By mounting the meters within the metering-panel housing, access to the circuit connections ahead of the meter is prevented and, consequently, theft of current is rendered impossible without external connections that would be immediately apparent and readily detected.

By reason of the fact that a portion of the meter casing is permitted to extend exteriorly of the housing, the depth of the housing is reduced to a minimum required only for the distributing and controlling apparatus. By reason of this fact, the manufacturing cost and total weight of the apparatus is reduced.

The arrangement of laterally operable switches having their contact jaws mounted upon the bus bars results in a shallow current-distributing-and-controlling device that reduces the required depth of the housing over that usually required, and the cost of manufacture is accordingly reduced by reason of the relatively small number of parts required for the distributing-and-controlling assembly.

In operation, the metering-panel unit is shipped to the point of installation with all connections made except those necessary to connect the meter terminals to the branch line main switch, such connections being indicated in Fig. 4 which illustrates the connection of two meter units to two branch-line circuits, each having a separate main switch 66 and circuit breaker 67 which control the fuse load circuits 68 and 69, respectively.

When it is desired to read the meter, in the event that the metering panel is mounted exteriorly of the building, it is only necessary to view the meter dials through the transparent covers. When it is desired to test a meter, the seal for that meter is broken, and the thumb nuts are removed to permit removal of the transparent cover. The meter unit may then be withdrawn and a tested accurate meter inserted in its place. The cover is then replaced and sealed in the manner specified above.

In order to exchange all of the meters within the housing, the seals 60 are broken and the trim clamps 52 moved to release the trim or cover. Since the meter covers 45 are removable with the trim plate, all meters are exposed simultaneously with the removal of the trim plate or housing cover, and may be exchanged without necessitating individual removal of the meter covers. Considerable time is thus saved.

In case the central-station operator or agent desires to disconnect a meter from service connection, the cover is removed and the meter turned around 180°, so that the contact plugs thereof clear the insulating block 29. The plugs are thus held out of connection while the meter is retained in position beneath its cover where it is accessible to an authorized person when it is desired to restore the circuit.

I have, therefore, provided an enclosed metering and distributing panel that occupies a minimum amount of space, may be readily installed, is accessible to authorized persons with a minimum effort and is less expensive than metering panels of the types now in use.

While I have illustrated but one embodiment of my invention, it will be apparent to those skilled in the art that various changes, modifications, substitutions, additions and omissions may be made in the apparatus illustrated without departing from the spirit and scope of my invention, as set forth in the appended claims.

I claim as my invention:

1. The combination with an enclosed metering and distributing panel having a plurality of plug-in meter receptacles within the enclosure, of a movable cover for the enclosure having individually removable covers for the meter receptacles for permitting access to any selected meter receptacle without movement of the movable cover.

2. The combination with an enclosed metering and distributing panel having a plurality of plug-in meter receptacles within the enclosure, of a movable cover for the enclosure having individually movable covers for the meter receptacles for permitting access to any selected meter receptacle without movement of the movable cover and means for sealing the meter covers against unauthorized movement.

3. The combination with an enclosed metering and distributing panel having a plurality of plug-in meter receptacles within the enclosure, of a removable cover for the enclosure having individually removable covers for the meter receptacles for permitting access to any selected meter receptacle without removal of the first of said removable covers, and means for sealing the meter receptacle covers and the removable cover against unauthorized removal.

4. The combination with an enclosed metering and distributing panel having a plurality of detachable meters within the enclosure, of a removable cover for the enclosure having individually removable covers for the meters for permitting access to any selected meter without removal of the first of said removable covers.

5. The combination with a plurality of encased watthour meters having terminal members thereon, of a metering panel having means secured thereto for removably receiving said meters, and contact means associated with said meter-receiving means disposed for cooperation with said meter-terminal members coincident with the movement of the meter into operative position, and a cover for said panel embodying means for maintaining said meters in operative positions.

6. The combination with a plurality of encased watthour meters having terminal members thereon, of a metering panel having means secured thereto for removably receiving said meters, and contact means associated with said meter-receiving means disposed for cooperation with said meter-terminal members coincident with the movement of the meter into operative position, and a cover for said panel embodying means for maintaining said meters in operative position and for permitting the selective removal thereof.

7. The combination with a plurality of encased watthour meters, of a metering panel embodying means for supporting said meters in operative positions, a cover for said panel provided with apertures for receiving a portion of the casing of said meters therethrough, and means cooperating with said cover for securing said meters in operative positions.

8. The combination with a plurality of encased watthour meters, of a metering panel embodying means for supporting said meters in operative positions, a cover for said panel provided with apertures for receiving a portion of the casing of said meters therethrough, and means secured to said cover adjacent to said apertures for individually maintaining said meters in operative positions.

9. The combination with an enclosed meter panel having a plug-in meter receptacle within the enclosure, of a movable cover for the enclosure having a removable cover for the meter receptacle for permitting access to the meter receptacle without movement of the movable cover.

10. An enclosed meter panel comprising an enclosure, a meter receptacle within the enclosure, a movable cover for the enclosure having an opening registering with the receptacle and a closure for the receptacle detachably secured to the cover and closing the said opening.

11. The combination with an enclosed metering panel having a plug-in meter receptacle within the enclosure, of a movable cover for the enclosure having an individually removable cover for the meter receptacle for permitting access to the meter receptacle without movement of the movable cover.

In testimony whereof, I have hereunto subscribed my name this 8th day of November, 1929.

HARRY P. SPARKES.